(12) United States Patent
Chiba et al.

(10) Patent No.: US 11,230,998 B2
(45) Date of Patent: Jan. 25, 2022

(54) VENTILATION APPARATUS OF INTERNAL COMBUSTION ENGINE

(71) Applicant: TOYOTA JIDOSHA KABUSHIKI KAISHA, Toyota (JP)

(72) Inventors: Masayuki Chiba, Susono (JP); Katsuichi Miyasaka, Gotemba (JP); Satoko Tofukuji, Tokyo-to (JP); Kenji Ikeda, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 15/595,123

(22) Filed: May 15, 2017

(65) Prior Publication Data
US 2017/0335808 A1   Nov. 23, 2017

(30) Foreign Application Priority Data

May 17, 2016 (JP) .............................. JP2016-098719

(51) Int. Cl.
| | |
|---|---|
| *F02M 35/10* | (2006.01) |
| *F01M 13/02* | (2006.01) |
| *F01M 13/00* | (2006.01) |
| *F01M 13/04* | (2006.01) |
| *F16N 31/02* | (2006.01) |
| *F02M 25/06* | (2016.01) |

(Continued)

(52) U.S. Cl.
CPC ...... *F02M 35/10222* (2013.01); *F01M 13/00* (2013.01); *F01M 13/023* (2013.01); *F01M 13/028* (2013.01); *F01M 2013/0422* (2013.01); *F01M 2013/0433* (2013.01); *F02B 67/06* (2013.01); *F02F 7/00* (2013.01); *F02M 25/06* (2013.01); *F02M 35/10209* (2013.01); *F16N 31/02* (2013.01)

(58) Field of Classification Search
CPC ....... F02M 35/10222; F02M 35/10209; F02M 25/06; F01M 13/0416; F01M 13/028; F01M 2013/0433; F01M 2013/0422; F01M 13/00; F01M 13/023; F02B 67/06; F02F 7/00; F16N 31/02
USPC ................................. 123/572, 41.86, 568.17
See application file for complete search history.

(56) References Cited

U.S. PATENT DOCUMENTS

| | | | | |
|---|---|---|---|---|
| 2,797,674 A | * | 7/1957 | Dolza .................. | F01M 13/022 123/572 |
| 3,175,546 A | * | 3/1965 | Roper .................. | F01M 13/025 123/572 |

(Continued)

FOREIGN PATENT DOCUMENTS

| | | |
|---|---|---|
| JP | H07-150923 A | 6/1995 |
| JP | H08326520 A | 12/1996 |

(Continued)

*Primary Examiner* — Logan M Kraft
*Assistant Examiner* — Joshua Campbell
(74) *Attorney, Agent, or Firm* — Hunton Andrews Kurth LLP

(57) ABSTRACT

A ventilation apparatus of an internal combustion engine of the invention ventilates a chain chamber by recirculating blow-by gas to an intake passage through a blow-by gas recirculation pipe and introducing air into the chain chamber through an air introduction pipe. The air introduction pipe is secured to a head cover wall portion which corresponds to a portion of a head cover wall which defines the chain chamber.

5 Claims, 10 Drawing Sheets

(51) Int. Cl.
*F02B 67/06* (2006.01)
*F02F 7/00* (2006.01)

(56) References Cited

U.S. PATENT DOCUMENTS

| | | | | |
|---|---|---|---|---|
| 4,958,613 | A * | 9/1990 | Hiraoka | F01M 13/0416 123/572 |
| 4,993,375 | A * | 2/1991 | Akihiko | F01M 13/0416 123/195 C |
| 5,487,371 | A * | 1/1996 | Beckman | F02M 25/06 123/572 |
| 5,564,380 | A * | 10/1996 | Kobayashi | F01L 1/02 123/192.2 |
| 6,481,411 | B1 * | 11/2002 | Katayama | F02B 61/045 123/339.23 |
| 6,695,658 | B1 * | 2/2004 | Muramatsu | F02B 61/045 440/88 L |
| 7,114,474 | B2 * | 10/2006 | Oshita | F02B 67/06 123/90.31 |
| 2003/0051680 | A1 * | 3/2003 | Ito | F01M 13/0416 123/41.86 |
| 2006/0032486 | A1 * | 2/2006 | Prasad | F01M 13/04 123/572 |
| 2009/0235907 | A1 * | 9/2009 | Satou | F01M 13/022 123/574 |
| 2010/0024762 | A1 * | 2/2010 | Koyamaishi | F02B 77/02 123/198 E |
| 2010/0077999 | A1 * | 4/2010 | Okada | F01M 13/022 123/572 |
| 2010/0242885 | A1 * | 9/2010 | Tabinoki | F01M 13/0416 123/90.31 |

FOREIGN PATENT DOCUMENTS

| | | | |
|---|---|---|---|
| JP | H10252441 | A | 9/1998 |
| JP | 2009-052424 | A | 3/2009 |
| JP | 2009052424 | A * | 3/2009 |
| JP | 2011-190721 | A | 9/2011 |
| KR | 19990060217 | A * | 7/1999 |

* cited by examiner

VENTILATION APPARATUS OF INTERNAL COMBUSTION ENGINE

CROSS-REFERENCE TO RELATED APPLICATION

The present application claims priority to Japanese Patent Application No. 2016-098719 filed on May 17, 2016, which is incorporated herein by reference in its entirety.

BACKGROUND OF THE INVENTION

Field of the Invention

The invention relates to a ventilation apparatus of an internal combustion engine for ventilating a chain chamber of the internal combustion engine.

Description of the Related Art

There is known an internal combustion engine provided with combustion chambers, an intake passage, a chain chamber for housing a timing chain and a ventilation apparatus (for example, refer to JP 2011-190721 A). The ventilation apparatus ventilates the chain chamber by recirculating combustion gas, i.e., blow-by gas, which flows out from the combustion chambers into the chain chamber, to the intake passage and introducing air to chain chamber.

The chain chamber defines a space for housing the timing chain which transmits rotation of a crank shaft of the engine to intake and exhaust cam shafts.

The ventilation apparatus (hereinafter, this ventilation apparatus will be referred to as "the conventional apparatus") includes an air introduction pipe for introducing the air into the chain chamber. The air introduction pipe is secured to a side wall of a cover which defines the chain chamber. Therefore, the air introduction pipe extends from the cover outwardly in an axial direction of the intake and exhaust cam shafts, i.e., in a lateral direction. Hereinafter, the intake and exhaust cam shafts will be collectively referred to as "the cam shafts".

It is desired that a dimension of the engine in the axial direction of the cam shafts is small. In this regard, the air introduction pipe of the conventional apparatus extending laterally outward from the cover increases the dimension of the engine in the axial direction of the cam shafts.

SUMMARY OF THE INVENTION

The invention has been made for solving the aforementioned problem. An object of the invention is to provide a ventilation apparatus of the engine for ventilating the chain chamber, which can prevent the dimension of the engine in the direction of the axis of the cam shaft from increasing.

A ventilation apparatus of an internal combustion engine according to the invention is applied to an internal combustion engine (10) comprising an intake passage (21p), a cylinder block (35), a cylinder head (30), a cylinder head cover (50), a crank shaft (14), an intake cam shaft (13i), an exhaust cam shaft (13e), a timing chain (65) and a chain cover (60). Hereinafter, the ventilation apparatus according to the invention will be referred to as "the invention apparatus".

At least one cylinder bore (12) is formed in the cylinder block (35). The cylinder head (30) is mounted on the cylinder block (35) at one side of the cylinder block (35) in a bore axis extension direction which corresponds to a direction of an extension of a bore axis (C1) which corresponds to a center axis of the at least one cylinder bore (12).

The cylinder head cover (50) is mounted on the cylinder head (30) at an opposite side of the cylinder head (30) with respect to the cylinder block (35) in the bore axis extension direction. The cylinder head cover (50) includes at least one head cover wall (51) which extends crossing the bore axis (C1).

The crank shaft (14) is provided at an opposite side of the cylinder block (35) with respect to the cylinder head (30) in the bore axis extension direction. The intake and exhaust cam shafts (13i, 13e) are provided between the cylinder head (30) and the cylinder head cover (50).

The timing chain (65) transmits rotation of the crank shaft (14) to the intake and exhaust cam shafts (13i, 13e). The chain cover (60) is mounted on the cylinder block (35) at one side of the cylinder block (35) in a cam shaft axis extension direction which corresponds to a direction of an extension of a cam shaft axis (C2) which corresponds to an axis of the intake cam shaft (13i). The chain cover (60) defines a chain chamber (18) in cooperation with the cylinder block (35), the cylinder head (30) and the at least one head cover wall (51), the chain chamber (18) housing the timing chain (65).

The invention apparatus comprises:
- a blow-by gas recirculation pipe (71) which communicates an interior of the chain chamber (18) with the intake passage (21p); and
- an air introduction pipe (72) provided with an air flow-out opening (72o) which opens to the interior of the chain chamber (18).

The invention apparatus is configured to ventilate the chain chamber (18) by recirculating blow-by gas in the chain chamber (18) to the intake passage (21p) through the blow-by gas recirculation pipe (71) and introducing air into the chain chamber (18) through the air introduction pipe (72).

The air introduction pipe (72) of the invention apparatus is secured to a head cover wall portion which corresponds to a portion of the head cover wall (51) which defines the chain chamber (18).

With this configuration of the air introduction pipe secured to the head cover wall portion of the head cover wall crossing the bore axis, the air introduction pipe extends from the head cover wall portion outwardly in the bore axis extension direction. Therefore, the dimension of the engine in the cam shaft axis extension direction can be prevented from increasing.

The timing chain (65) of the invention apparatus may run on a timing chain running plane (Pc) which corresponds to a plane perpendicular to the cam shaft axis (C2) and run straight at an area of the interior of the chain chamber (18) around the air flow-out opening (72o).

In this case, when projecting an air flow-out direction (Da) which corresponds to a direction of a flow-out of the air from the air flow-out opening (72o) and a timing chain running direction (Dc) which corresponds to a direction of a running of the timing chain (65) at the area of the interior of the chain chamber (18) around the air flow-out opening (72o) to the timing chain running plane (Pc), the air introduction pipe (72) may be secured to the head cover wall portion such that an angle (θ) between the projected air flow-out direction (Dap) and the projected timing chain running direction (Dcp) is an acute angle.

Lubrication oil for lubricating the engine adheres to the timing chain. Thus, during an operation of the engine, the lubrication oil spatters away from the timing chain. Therefore, when the angle between the flow-out direction and the running direction projected to the plane perpendicular to the cam shaft axis is an obtuse angle, the spattering lubrication oil may enter into the air introduction pipe. In this case, an amount of the lubrication oil which can be used for lubricating the engine, decreases.

In the invention apparatus, the angle between the flow-out direction and the running direction projected to the plane perpendicular to the cam shaft axis is the acute angle. Thus, the lubrication oil may not enter into the air introduction pipe. Therefore, the amount of the lubrication oil which can be used for lubricating the engine can be prevented from decreasing.

Further, in the invention apparatus, the timing chain (65) may run on a timing chain running plane (Pc) corresponding to a plane perpendicular to the cam shaft axis (C2). In this case, a barrier wall (50w) may be provided between the air flow-out opening (72o) and a crossing position (P1) at which a projected passage axis (C4p) crosses a timing chain portion (65a), the projected passage axis (C4p) corresponds to an axis (C4) projected to the timing chain running plane (Pc), the timing chain portion (65a) corresponding to a portion of the timing chain (65) which runs at the area of the interior of the chain chamber (18) around the air flow-out opening (72o).

With this configuration, the lubrication oil spattering away from the timing chain toward the air flow-out opening spatters on the barrier wall before the spattering lubrication oil reaches the air flow-out opening. Thus, the lubrication oil is unlikely to reach the air flow-out opening. As a result, the lubrication oil is unlikely to enter into the air introduction pipe. Therefore, the amount of the lubrication oil which can be used for lubricating the engine can be prevented from decreasing.

Further, in the invention apparatus, the engine (10) may comprise a top damper (66) between the head cover wall portion and a timing chain portion (65a) corresponds to a portion of the timing chain (65) which runs at the area of the interior of the chain chamber (18) around the air flow-out opening (72o). In this case, the air introduction pipe (72) may be secured to the head cover wall portion such that the top damper (66) exists between the air flow-out opening (72o) and the timing chain portion (65a).

With this configuration, the lubrication oil spattering away from the timing chain toward the air introduction opening spatters on the top damper before the spattering lubrication oil reaches the air introduction opening. Thus, the lubrication oil is unlikely to reach the air introduction pipe. As a result, the lubrication oil is unlikely to enter into the air introduction pipe. Therefore, the amount of the lubrication oil which can be used for lubricating the engine can be prevented from decreasing.

In addition, in the invention apparatus, the air introduction pipe (72) may be secured to the head cover wall portion such that the air introduction opening (70o) opens to the interior of the chain chamber (18) at a position remote from a timing chain running plane (Pc) in a direction perpendicular to the timing chain running plane (Pc), the timing chain running plain (Pc) corresponding to a plane perpendicular to the cam shaft axis (C2) and on which the timing chain (65) runs.

An amount of the lubrication oil spattering away from the timing chain in a direction away from the running direction of the timing chain, i.e., a direction away from the timing chain running plane is smaller than an amount of the lubrication oil spattering away from the timing chain in the running direction of the timing chain. In the invention apparatus, the air introduction opening opens to the interior of the chain chamber at the position remote from the timing chain running plane in the direction perpendicular to the timing chain running plane. Thus, the amount of the lubrication oil spattering away from the timing chain toward the air introduction opening is small. As a result, the large amount of the lubrication oil is unlike to enter into the air introduction pipe. Therefore, the amount of the lubrication oil which can be used for lubricating the engine can be prevented from decreasing considerably.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Below, with reference to the drawings, a ventilation apparatus of an internal combustion engine according to embodiments of the invention will be described. A ventilation apparatus according to a first embodiment of the invention is applied to an internal combustion engine 10 shown in FIG. 1. Hereinafter, the ventilation apparatus according to the first embodiment will be referred to as "the first embodiment apparatus".

Figure 1:
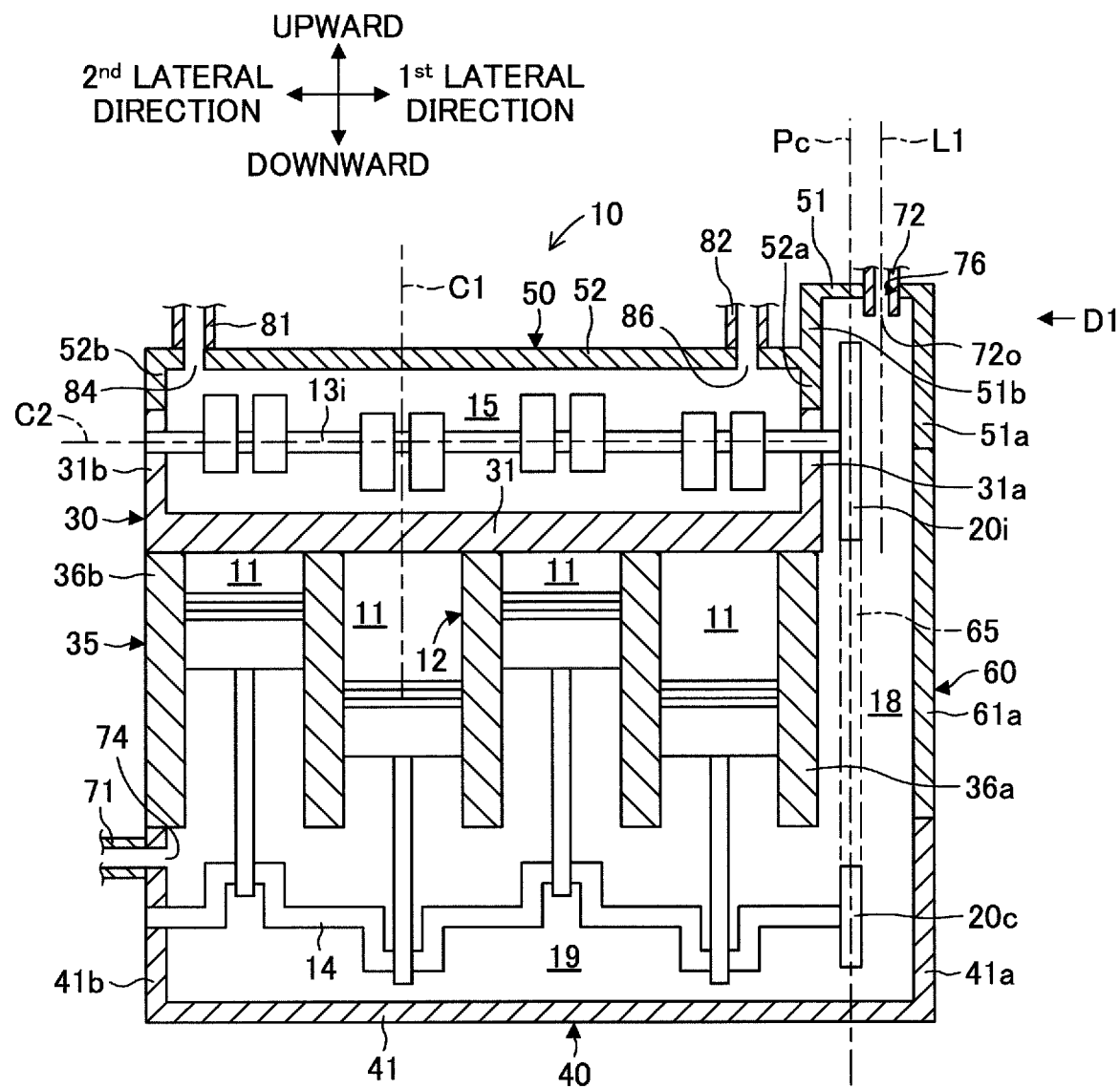
FIG. 1 is a view for showing an internal combustion engine, to which a ventilation apparatus according to a first embodiment of the invention (hereinafter, the ventilation apparatus according to the first embodiment will be referred to as "the first embodiment apparatus") is applied.

As shown in FIG. 1, the engine 10 includes a cylinder head 30, a cylinder block 35, an oil pan 40, a cylinder head cover 50 and a chain cover 60.

Hereinafter, a term "upward" means a direction toward a valve train chamber 15 in a direction of an extension of a center axis C1 of each of cylinder bores 12 each defining a combustion chamber 11. In other words, the term "upward" means a direction toward an upper side in FIG. 1. Hereinafter, the center axis C1 will be referred to as "the bore axis C1". A term "upper" means a side of the valve train chamber 15 in the direction of the extension of the center axis C1. In other words, the term "upper" means the upper side in FIG. 1. A term "downward" means a direction toward a crank shaft chamber 19 in the direction of the extension of the bore axis C1. In other words, the term "downward" means a direction toward a lower side in FIG. 1. A term "lower" means a side of the crank shaft chamber 19 in the direction of the extension of the bore axis C1. In other words, the term "lower" means the lower side in FIG. 1.

Further, a term "first lateral" means a side of a chain chamber 18 in a direction of an extension of an axis C2 of an intake cam shaft 13i. In other words, the term "first lateral" means a right side in FIG. 1. Hereinafter, the axis C2 will be referred to as "the cam shaft axis C2". It should be noted that the cam shaft axis C2 is perpendicular to the bore axis C1. A term "second lateral" means a side opposite to a first lateral side. In other words, the term "second lateral" means a left side in FIG. 1.

Figure 2:
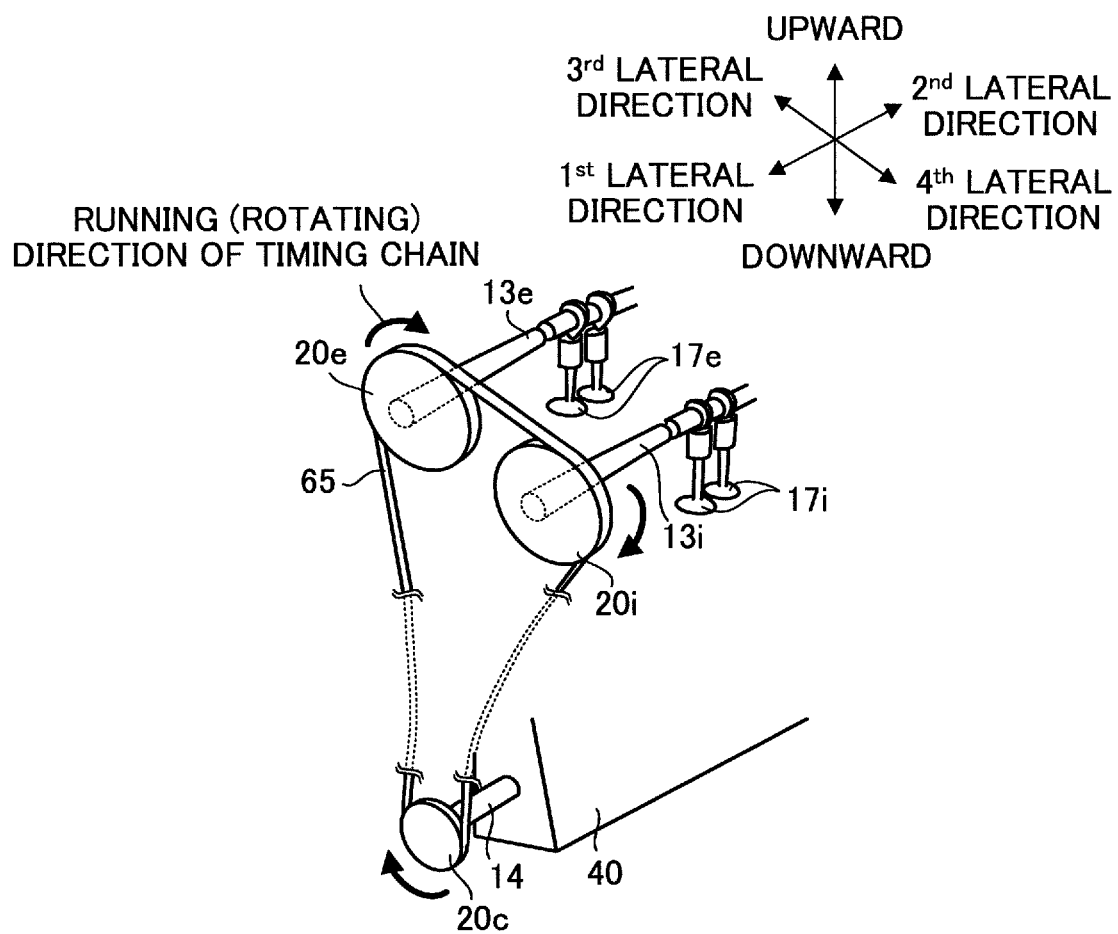
FIG. 2 is a view for showing a timing chain of the engine shown in FIG. 1 and surroundings thereof.

In addition, hereinafter, a term "third lateral" means a side of an exhaust cam shaft 13e in a direction perpendicular to the bore axis C1 and the cam shaft axis C2 as shown in FIG. 2. A term "forth lateral" means a side opposite to a third lateral side, that is, a side of the intake cam shaft 13i in the direction perpendicular to the bore axis C1 and the cam shaft axis C2.

Figure 3A:
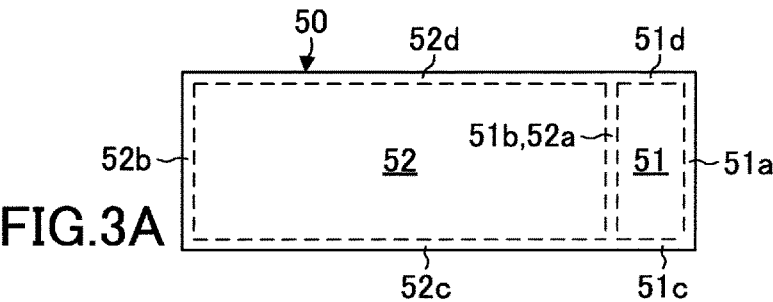
FIG. 3A is a top view of a cylinder head cover shown in FIG. 1.
Figure 3A:
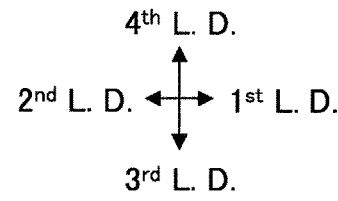
Figure 3B:
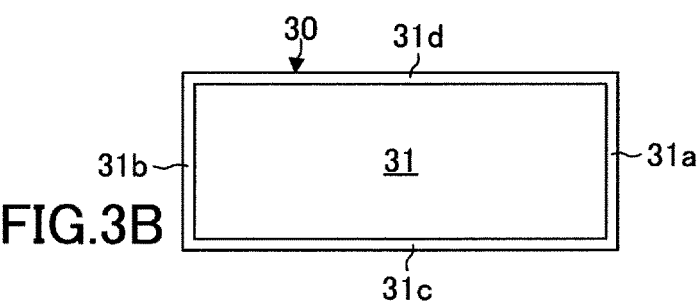
FIG. 3B is a top view of a cylinder head shown in FIG. 1.
Figure 3B:
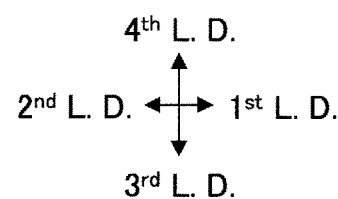

As shown in FIGS. 1 and 3B, the cylinder head 30 includes a lower wall 31 and lateral walls 31a to 31d. The lower wall 31 extends crossing the bore axis C1. In particular, the lower wall 31 extends substantially perpendicular to the bore axis C1. The lateral walls 31a to 31d extend upward from first to fourth lateral ends of the lower wall 31, respectively. A third lateral end of the lateral wall 31a is connected to a first lateral end of the lateral wall 31c. A fourth lateral end of the lateral wall 31a is connected to a first lateral end of the lateral wall 31d. A third lateral end of the lateral wall 31b is connected to a second lateral end of the lateral wall 31c. A fourth lateral end of the lateral wall 31b is connected to a second lateral end of the lateral wall 31d.

Figure 3C:
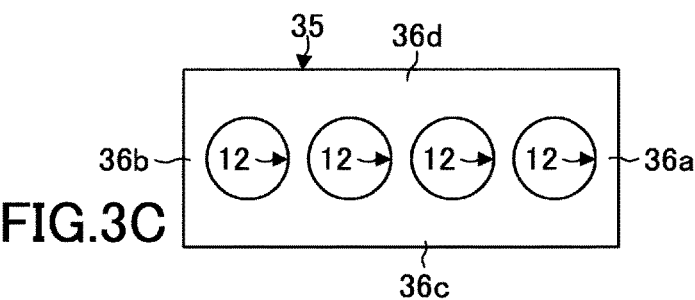
FIG. 3C is a top view of a cylinder block shown in FIG. 1.
Figure 3C:
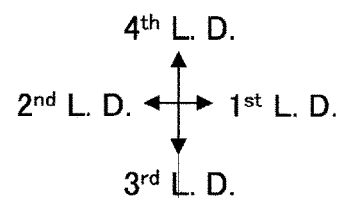

As shown in FIGS. 1 and 3C, the cylinder block 35 includes lateral portions 36a to 36d. The lateral portion 36a extends perpendicular to the cam shaft axis C2 at a first lateral area of the cylinder block 35. The lateral portion 36b extends perpendicular to the cam shaft axis C2 at a second lateral area of the cylinder block 35. The lateral portion 36c extends parallel to the bore axis C1 and the cam shaft axis C2 at a third lateral area of the cylinder block 35. The lateral portion 36d extends parallel to the bore axis C1 and the cam shaft axis C2 at a fourth lateral area of the cylinder block 35. A third lateral end of the lateral portion 36a is connected to a first lateral end of the lateral portion 36c. A fourth lateral end of the lateral portion 36a is connected to a first lateral end of the lateral portion 36d. A third lateral end of the lateral portion 36b is connected to a second lateral end of the lateral portion 36c. A fourth lateral end of the lateral portion 36b is connected to a second lateral end of the lateral portion 36d.

Figure 3D:
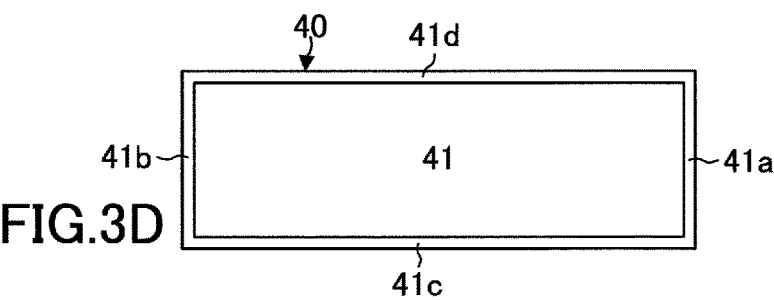
FIG. 3D is a top view of an oil pan shown in FIG. 1.
Figure 3D:
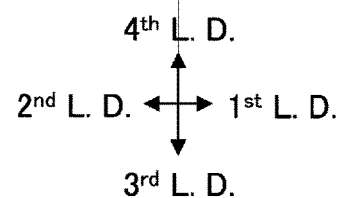

As shown in FIGS. 1 and 3D, the oil pan 40 includes a lower wall 41 and lateral walls 41a to 41d. The lower wall 41 extends crossing the bore axis C1. The lateral walls 41a to 41d extend upward from first to fourth ends of the lower wall 41, respectively.

As shown in FIGS. 1 and 3A, the cylinder head cover 50 includes an upper wall 51, lateral walls 51a to 51d, an upper wall 52 and lateral walls 52a to 52d. The upper wall 51 extends crossing the bore axis C1 substantially perpendicular to the bore axis C1 at a first lateral area of the cylinder head cover 50. The upper wall 52 extends crossing the bore axis C1 substantially perpendicular to the bore axis C1 at a second lateral area of the cylinder head cover 50. The lateral walls 51a to 51d extend downward from first to fourth lateral ends of the upper wall 51, respectively. The lateral walls 52a to 52d extend downward from first to fourth lateral ends of the upper wall 52, respectively.

A third lateral end of the lateral wall 51a is connected to a first lateral end of the lateral wall 51c. A fourth lateral end of the lateral wall 51a is connected to a first lateral end of the lateral wall 51d. A third lateral end of the lateral wall 51b is connected to a second lateral end of the lateral wall 51c. A fourth lateral end of the lateral wall 51b is connected to a second lateral end of the lateral wall 51d. A lower end of the lateral wall 51b is connected to the first lateral end of the upper wall 52.

A lower portion of the second lateral end of the 51c is connected to a third lateral end of the lateral wall 52a or a first lateral end of the lateral wall 52c. A lower portion of the second lateral end of the lateral wall 51d is connected to a fourth lateral end of the lateral wall 52a or a first lateral end of the lateral wall 52d.

The third lateral end of the lateral wall 52a is connected to the first lateral end of the lateral wall 52c. The fourth lateral end of the lateral wall 52a is connected to the first lateral end of the lateral wall 52d. A third lateral end of the lateral wall 52b is connected to a second lateral end of the lateral wall 52c. A fourth lateral end of the lateral wall 52b is connected to a second lateral end of the lateral wall 52d.

The cylinder head cover 50 has a generally rectangular parallelepiped lid shape. In the cylinder head cover 50, a rectangular parallelepiped space which opens downward is defined by the upper wall 51, the lateral walls 51a to 51d and the lateral wall 52a and another rectangular parallelepiped space which opens downward is defined by the upper wall 52 and the lateral walls 52a to 52d.

Figure 3E:
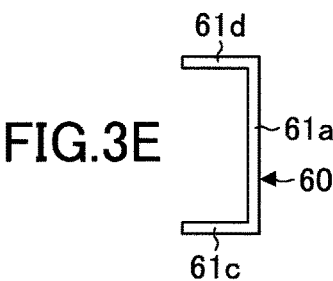
FIG. 3E is a top view of a chain cover shown in FIG. 1.
Figure 3E:
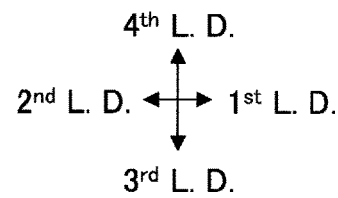

As shown in FIGS. 1 and 3E, the chain cover 60 includes lateral walls 61a, 61c and 61d. The lateral wall 61a extends crossing the cam shaft axis C2 generally perpendicular to the cam shaft axis C2. The lateral wall 61c extends from a third lateral end of the lateral wall 61a in a second lateral direction. The lateral wall 61d extends from a fourth lateral end of the lateral wall 61a in the second lateral direction.

As shown in FIG. 1, the lower wall 31 of the cylinder head 30 is secured to upper ends of the lateral portions 36a to 36d of the cylinder block 35. Lower ends of the lateral walls 52a to 52d of the cylinder head cover 50 are secured to upper ends of the lateral walls 31a to 31d of the cylinder head 30, respectively. The cylinder head cover 50 covers upper areas of the cylinder head 30 and the timing chain 65.

The valve train chamber 15 is defined by the upper wall 52 and the lateral walls 52a to 52d of the cylinder head cover 50 and the lower wall 31 and the lateral walls 31a to 31d of the cylinder head 30. In the valve train chamber 15, a valve train mechanism including the intake and exhaust cam shafts 13i and 13e and the like is housed (refer to FIG. 2). The valve train mechanism opens and closes intake valves 17i and exhaust valves 17e (refer to FIG. 2).

Upper ends of the lateral walls 61a, 61c and 61d of the chain cover 60 are secured to lower ends of the lateral walls 51a, 51c and 51d, respectively. Lower ends of the lateral walls 61a, 61c and 61d of the chain cover 60 are secured to upper ends of the lateral walls 41a, 41c and 41d of the oil pan 40.

A second lateral end of the lateral wall 61c of the chain cover 60 is secured to a third lateral portion of the lateral wall 31a of the cylinder head 30 and a third lateral portion of the lateral portion 36a of the cylinder block 35. A second lateral end of the lateral wall 61d of the chain cover 60 is secured to a fourth lateral portion of the lateral wall 31a of the cylinder head 30 and a fourth lateral portion of the lateral portion 36a of the cylinder block 35.

The chain chamber 18 is defined by the upper wall 51 and the lateral walls 51a to 51d and 52a of the cylinder head cover 50, the lateral wall 31a of the cylinder head 30, the lateral portion 36a of the cylinder block 35, the lower wall 41 and the lateral walls 41a, 41c and 41d of the oil pan 40 and the lateral walls 61a, 61c and 61d of the chain cover 60. In the chain chamber 18, the timing chain 65 is housed.

The lateral wall 52a of the cylinder head cover 50 separates the chain chamber 18 from the valve train chamber 15 such that gas does not flow between the chain chamber 18 and the valve train chamber 15. Therefore, an upper area of an interior of the chain chamber 18 does not communicate with an interior of the valve train chamber 15. On the other hand, a lower area of the interior of the chain chamber 18 communicates with an interior of the crank shaft chamber 19.

As shown in FIG. 2, the timing chain 65 is provided around an intake sprocket 20i mounted on the intake cam shaft 13i, an exhaust sprocket 20e mounted on the exhaust cam shaft 13e and a crank shaft sprocket 20c mounted on a crank shaft 14.

The timing chain 65 transmits rotation of the crank shaft 14 to the intake cam shaft 13i via the intake sprocket 20i and transmits the rotation of the crank shaft 14 to the exhaust cam shaft 13e via the exhaust sprocket 20e.

As shown in FIG. 1, the timing chain 65 runs on a plane Pc perpendicular to the cam shaft axis C2. Hereinafter, the plane Pc will be referred to as "the timing chain running plane Pc".

As shown in FIG. 2, the timing chain 65 is provided linearly or straight in a direction perpendicular to the cam shaft axis C2 at an area of the interior of the chain chamber 18 around the upper wall 51 of the cylinder head cover 50, that is, at an area between the intake and exhaust sprockets 20i and 20e. In this embodiment, during an operation of the engine 10, the timing chain 65 runs linearly or straight toward the intake sprocket 20i from the exhaust sprocket 20e.

As shown in FIG. 1, the upper ends of the lateral walls 41b to 41d of the oil pan 40 are secured to lower ends of the lateral portions 36b to 36d of the cylinder block 35, respectively.

The crank shaft chamber 19 is defined by the lower wall 41 and the lateral walls 41a to 41d of the oil pan 40. In the crank shaft chamber 19, the crank shaft 14 is housed. At a lower area of the crank shaft chamber 19, lubrication oil (not shown) is reserved.

Figure 4:
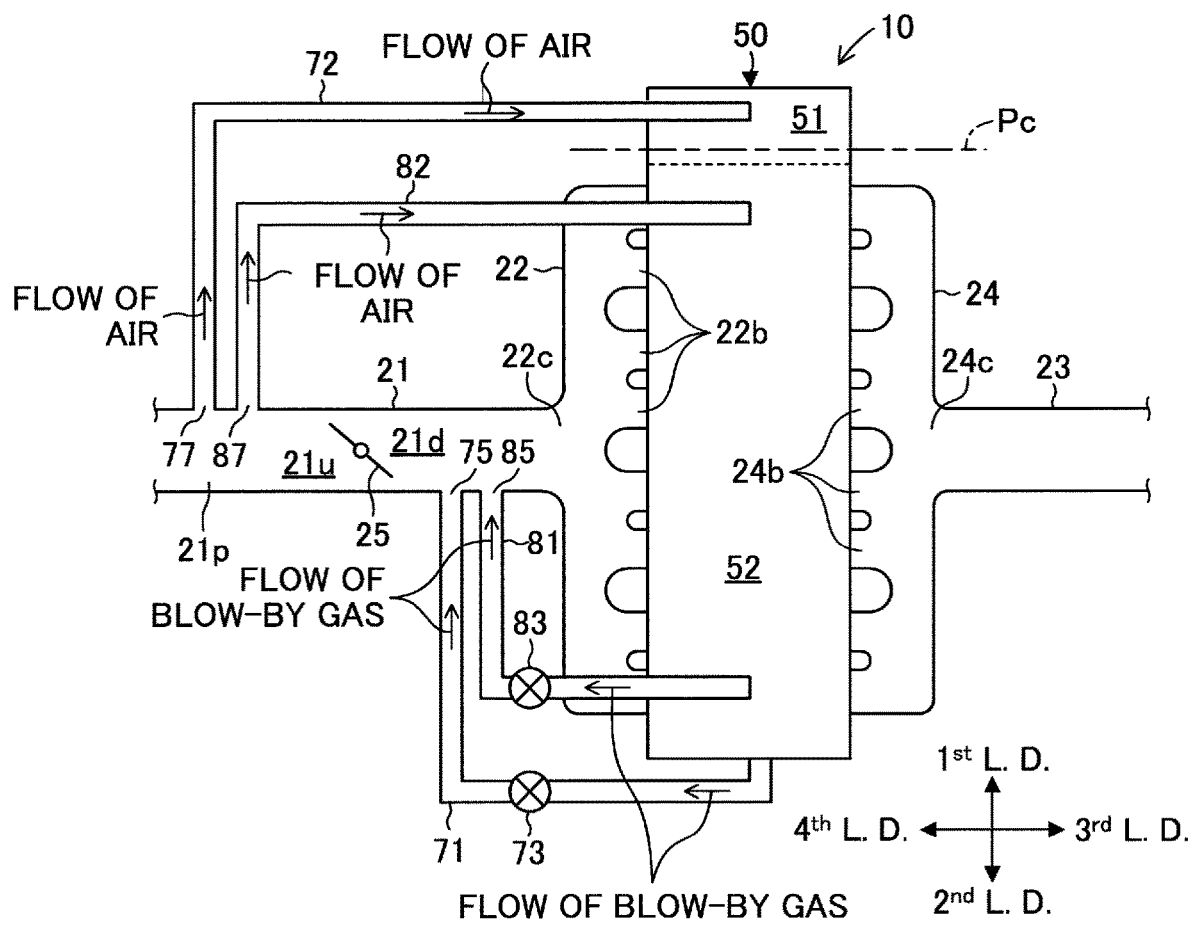
FIG. 4 is a view for showing the engine, to which the first embodiment apparatus is applied.

As shown in FIG. 4, the engine 10 includes an intake pipe 21, an intake manifold 22, an exhaust pipe 23 and an exhaust manifold 24.

Branch portions 22b of the intake manifold 22 are connected to the cylinder head 30 such that interior passages of the branch portions 22b communicate with intake ports (not shown) formed in the cylinder head 30, respectively. A collection portion 22c of the intake manifold 22 is connected to one end of the intake pipe 21. A throttle valve 25 is provided in an interior passage 21p of the intake pipe 21. Hereinafter, the interior passage 21p will be referred to as "the intake passage 21p".

Branch portions 24b of the exhaust manifold 24 are connected to the cylinder head 30 such that interior passages of the branch portions 24b communicate with exhaust ports formed in the cylinder head 30, respectively. A collection portion 24c of the exhaust manifold 24 is connected to one end of the exhaust pipe 23.

The engine 10 includes a first ventilation apparatus for ventilating the chain chamber 18 and the crank shaft chamber 19 and a second ventilation apparatus for ventilating the valve train chamber 15.

The first ventilation apparatus includes a first blow-by gas recirculation pipe 71, a first air introduction pipe 72 and a first blow-by gas control valve 73. Hereinafter, the first blow-by gas recirculation pipe 71 will be referred to as "the first recirculation pipe 71", the first air introduction pipe 72 will be referred to as "the first introduction pipe 72" and the first blow-by gas control valve 73 will be referred to as "the first control valve 73".

As shown in FIG. 1, a first blow-by gas discharge 74 is provided in the lateral wall 41b of the oil pan 40. One end of the first recirculation pipe 71 is secured to the oil pan 40 such that an interior passage of the first recirculation pipe 71 communicates with the interior of the crank shaft chamber 19 through the first blow-by gas discharge aperture 74.

As shown in FIG. 4, a first blow-by gas introduction aperture 75 is provided in the intake pipe 21. The first blow-by gas introduction aperture 75 communicates with an area 21d of the intake passage 21p downstream of the throttle valve 25. Hereinafter, the area 21d will be referred to as "the throttle valve downstream passage 21d"). The other end of the first recirculation pipe 71 is connected to the intake pipe 21 such that the interior passage of the first recirculation pipe 71 communicates with the throttle valve downstream passage 21d through the first blow-by gas introduction aperture 75.

The first control valve 73 is provided in the first recirculation pipe 71. The first control valve 73 controls an introduction of blow-by gas from the crank shaft chamber 19 to the throttle valve downstream passage 21d through the first recirculation pipe 71. When the first control valve 73 opens, the interior of the crank shaft chamber 19 communicates with the throttle valve downstream passage 21d. When the first control valve 73 is closed, the communication between the interior of the crank shaft chamber 19 and the throttle valve downstream passage 21d is shut off.

As shown in FIG. 1, a first air introduction aperture 76 is provided in the upper wall 51 of the cylinder head cover 50. One end of the first introduction pipe 72 is inserted into the first air introduction aperture 76 to be secured to the upper wall 51 such that an air flow-out opening 72o of the first introduction pipe 72 opens to the interior of the chain chamber 18 and an interior passage of the first introduction pipe 72 communicates with the interior of the chain chamber 18.

Figure 5:
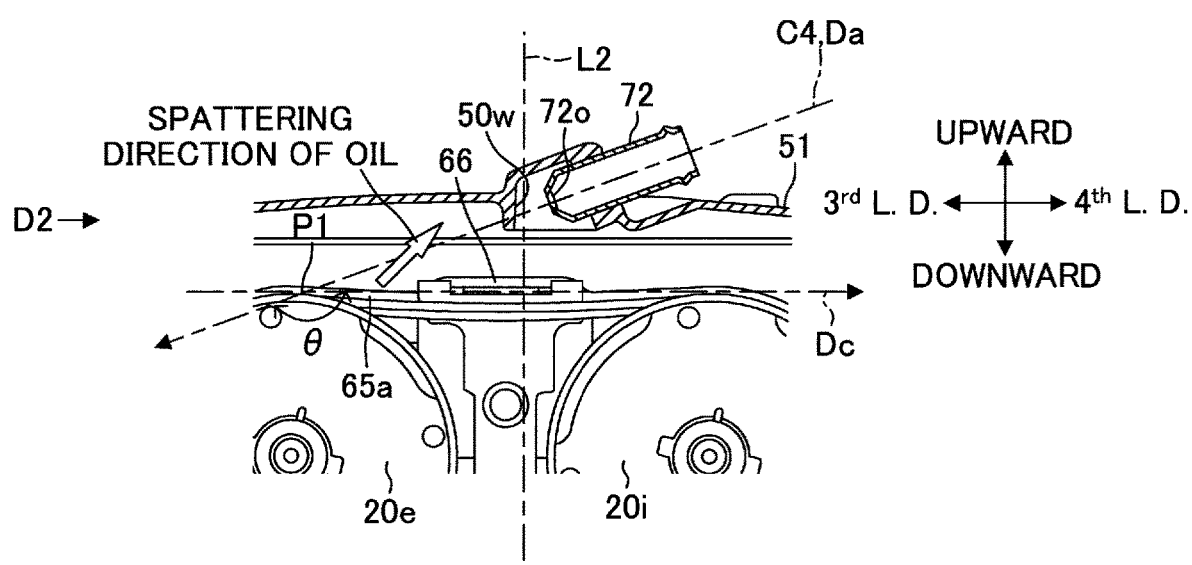
FIG. 5 is a view for showing a part of a cross section of the engine along a line L1 shown in FIG. 1 in a direction D1 shown in FIG. 1.

As shown in FIG. 5, a portion 65a of the timing chain 65 which runs at an area of the interior of the chain chamber 18 around the air flow-out opening 72o, runs linearly or straight in a direction perpendicular to the bore axis C1 and the cam shaft axis C2. Hereinafter, the portion 65a will be referred to as "the timing chain portion 65a".

When a direction Da which air flows out from the air flow-out opening 72o to the interior of the chain chamber 18 projected on the timing chain running plane Pc is referred to as "the projected flow-out direction Dap" and a direction Dc which the timing chain portion 65a runs projected to the timing chain running plane Pc is referred to as "the projected running direction Dcp", the first introduction pipe 72 is secured to the upper wall 51 of the cylinder head cover 50 such that an angle θ between the projected flow-out directions Dap and the projected running direction Dcp is an obtuse angle. Hereinafter, the direction Da will be referred to as "the air flow-out direction Da" and the direction Dc will be referred to as "the timing chain running direction Dc".

When an axis C4 of a passage of the first introduction pipe 72 around the air flow-out opening 72o projected on the timing chain running plane Pc is referred to as "the projected passage axis C4p", a barrier wall 50w is provided between the air flow-out opening 72o and a part of the timing chain portion 65a at a position P1 which the projected passage axis C4p crosses the timing chain portion 65a. The barrier wall 50w extends downward in the direction of the extension of the bore axis C1 from a bottom wall surface of the upper wall 51.

The engine 10 includes a top damper 66 between the timing chain portion 65a and the upper wall 51 and between the intake and exhaust sprockets 20i and 20e. The top damper 66 reduces vibration of the timing chain 65. The first introduction pipe 72 is secured to the upper wall 51 such that the top damper 66 exists between the air flow-out opening 72o and the timing chain portion 65a. In other words, the first introduction pipe 72 is secured to the upper wall 51 at an upper side of the top damper 66 such that the air flow-out opening 72o opens to an area of the interior of the chain chamber 18 at the upper side of the top damper 66.

Figure 6:
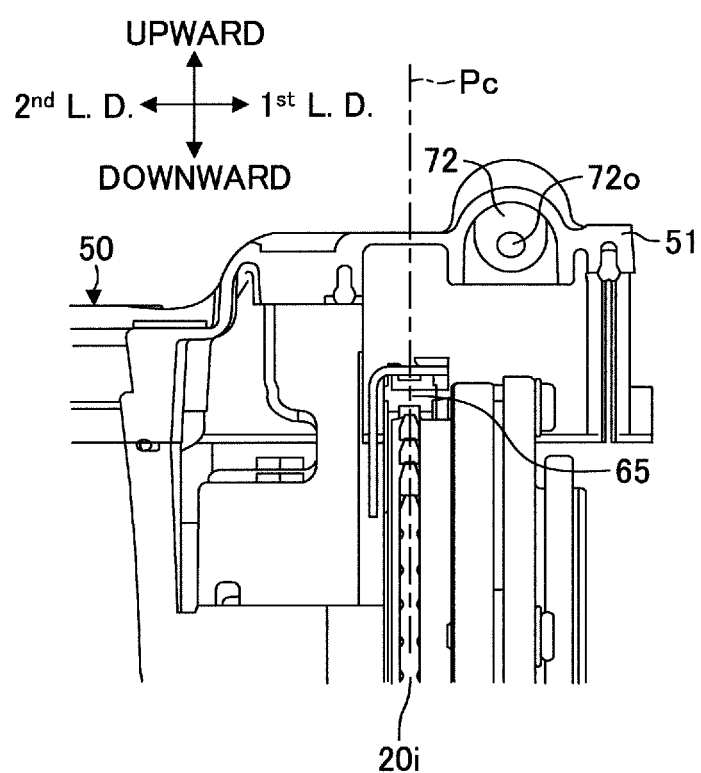
FIG. 6 is a view for showing a part of a cross section of the engine along a line L2 shown in FIG. 1 in a direction D2 shown in FIG. 1.

As shown in FIG. 6, the first introduction pipe 72 is secured to the upper wall 51 such that the air flow-out opening 72o opens to the interior of the chain chamber 18 at a position remote from the timing chain running plane Pc in a first lateral direction.

As shown in FIG. 4, a first air discharge aperture 77 is provided in the intake pipe 21. The first air discharge aperture 77 communicates with an area 21u of the intake passage 21p upstream of the throttle valve 25. Hereinafter, the area 21u will be referred to as "the throttle valve upstream passage 21u". The other end of the first introduction pipe 72 is secured to the intake pipe 21 such that an interior passage of the first introduction pipe 72 communicates with the throttle valve upstream passage 21u via the first air discharge aperture 77.

The second ventilation apparatus includes a second blow-by gas recirculation pipe 81, a second air introduction pipe 82 and a second blow-by gas control valve 83. Hereinafter, the second blow-by gas recirculation pipe 81 will be referred to as "the second recirculation pipe 81", the second air introduction pipe 82 will be referred to as "the second introduction pipe 82" and the second blow-by gas control valve 83 will be referred to as "the second control valve 83".

As shown in FIG. 1, a second blow-by gas discharge aperture 84 is provided in a second lateral end portion of the upper wall 52 of the cylinder head cover 50. One end of the second recirculation pipe 81 is secured to the cylinder head cover 50 such that an interior passage of the second recirculation pipe 81 communicates with the interior of the valve train chamber 15 via the second blow-by gas discharge aperture 84.

As shown in FIG. 4, a second blow-by gas introduction aperture 85 is provided in the intake pipe 21. The second blow-by gas introduction aperture 85 communicates with the throttle valve downstream passage 21d. The other end of the second recirculation pipe 81 is secured to the intake pipe 21 such that the interior passage of the second recirculation pipe 81 communicates with the throttle valve downstream passage 21d via the second blow-by gas introduction aperture 85.

The second control valve 83 is provided in the second recirculation pipe 81. The second control valve 83 controls the introduction of the blow-by gas from the valve train chamber 15 to the throttle valve downstream passage 21d through the second recirculation pipe 81. When the second control valve 83 opens, the interior of the valve train chamber 15 communicates with the throttle valve downstream passage 21d. When the second control valve 83 is closed, the communication between the interior of the valve train chamber 15 and the throttle valve downstream passage 21d is shut off.

As shown in FIG. 1, a second air introduction aperture 86 is provided in a first lateral end portion of the upper wall 52 of the cylinder head cover 50. One end of the second introduction pipe 82 is secured to the cylinder head cover 50 such that an interior passage of the second introduction pipe 82 communicates with the interior of the valve train chamber 15 via the second air introduction aperture 86.

As shown in FIG. 4, a second air discharge aperture 87 is provided in the intake pipe 21. The second air discharge aperture 87 communicates with the throttle valve upstream passage 21u. The other end of the second introduction pipe 82 is secured to the intake pipe 21 such that the interior passage of the second introduction pipe 82 communicates with the throttle valve upstream passage 21u via the second air discharge aperture 87.

<Operation of First Embodiment Apparatus>

Next, an operation of the first embodiment apparatus will be described. As described above, when the first control valve 73 of the first ventilation apparatus opens, the interior of the crank shaft chamber 19 communicates with the throttle valve downstream passage 21d. In this case, the blow-by gas in the crank shaft chamber 19 is introduced into the throttle valve downstream passage 21d through the first recirculation pipe 71 by a negative pressure generated in the throttle valve downstream passage 21d. That is, the blow-by gas is discharged from the crank shaft chamber 19 to an outside thereof. As a result of a discharge of the blow-by gas from the crank shaft chamber 19, the blow-by gas in the chain chamber 18 flows into the crank shaft chamber 19. The blow-by gas flowing into the crank shaft chamber 19 is also introduced into the throttle valve downstream passage 21d through the first recirculation pipe 71.

As a result of a flow of the blow-by gas from the chain chamber 18 into the crank shaft chamber 19, the air is introduced from the throttle valve upstream passage 21u into the chain chamber 18 through the first introduction pipe 72. Thereby, the chain chamber 18 and the crank shaft chamber 19 are ventilated.

On the other hand, when the first control valve 73 is closed, the communication between the interior of the crank shaft chamber 19 and the throttle valve downstream passage 21d is shut off. Therefore, an introduction of the blow-by gas from the crank shaft chamber 19 into the throttle valve downstream passage 21d through the first recirculation pipe 71 stops. As a result, the flow of the blow-by gas from the chain chamber 18 into the crank shaft chamber 19 stops. As a result, the introduction of the air from the throttle valve upstream passage 21u into the chain chamber 18 through the first introduction pipe 72 also stops.

Next, an operation of the second ventilation apparatus will be described. As described above, when the second control valve 83 of the second ventilation apparatus opens, the interior of the valve train chamber 15 communicates with the throttle valve downstream passage 21d. In this case, the blow-by gas in the valve train chamber 15 is introduced into the throttle valve downstream passage 21d through the second recirculation pipe 81 by the negative pressure generated in the throttle valve downstream passage 21d. That is, the blow-by gas is discharged from the valve train chamber 15 to the outside thereof. As a result of the discharge of the blow-by gas, the air is introduced from the throttle valve upstream passage 21u into the valve train chamber 15 through the second introduction pipe 82. Thereby, the valve train chamber 15 is ventilated.

On the other hand, when the second control valve 83 is closed, the communication between the interior of the valve train chamber 15 and the throttle valve downstream passage 21d is shut off. Therefore, the introduction of the blow-by gas from the valve train chamber 15 into the throttle valve downstream passage 21d through the second recirculation pipe 81 stops. As a result, the introduction of the air from the throttle valve upstream passage 21u into the valve train chamber 15 through the second introduction pipe 82 also stops.

The operation of the first embodiment apparatus has been described. The chain chamber 18 and the crank shaft chamber 19 are ventilated by operating the first ventilation apparatus to open the first control valve 73. The valve train chamber 15 is ventilated by operating the second ventilation apparatus to open the second control valve 83.

In the first embodiment apparatus, the first introduction pipe 72 is secured to the upper wall 51. Thus, a dimension of the engine 10 in the direction of the extension of the cam shaft axis C2 is small, compared with a case that the first introduction pipe 72 is secured to the lateral wall 51a. Therefore, with the first embodiment apparatus, the dimension of the engine 10 in the direction of the extension of the cam shaft axis C2 derived from the first introduction pipe 72 for introducing the air into the chain chamber 18 which is secured to a portion of the cylinder head cover 50 defining the chain chamber 18, can be prevented from increasing.

Further, during the operation of the engine 10, the timing chain 65 runs around the crank shaft sprocket 20c, the exhaust sprocket 20e and the intake sprocket 20i. In particular, the timing chain portion 65a runs in the timing chain running direction Dc from the exhaust sprocket 20e toward the intake sprocket 20i. As shown in FIG. 5, due to such a running of the timing chain portion 65a, the lubrication oil adhering to the timing chain portion 65a spatters away from the timing chain portion 65a obliquely upward toward the air flow-out opening 72o of the first introduction pipe 72.

If the spattering-away lubrication oil enters into the first introduction pipe 72, a part of the lubrication oil may not return to the chain chamber 18. In this case, an amount of the lubrication oil which can be used for lubricating the engine 10 is decreased.

In the first embodiment apparatus, the lubrication oil spattering away from the timing chain portion 65a toward the air flow-out opening 72o of the first introduction pipe 72 spatters on the barrier wall 50w. Thus, the lubrication oil is unlikely to reach the air flow-out opening 72o. Therefore, the amount of the lubrication oil which can be used for lubricating the engine 10 is unlikely to decreased.

Furthermore, an amount of the lubrication oil spattering away from the timing chain portion 65a obliquely upward in a direction away from the timing chain running plane Pc is smaller than an amount of the lubrication oil spattering away from the timing chain portion 65a in a direction along the timing chain running plane Pc.

In the first embodiment apparatus, the air flow-out opening 72o opens to the interior of the chain chamber 18 at the position remote from the timing chain running plane Pc in the first lateral direction. Thus, the amount of the lubrication oil spattering toward the air flow-out opening 72o is relatively small. For this reason, the lubrication oil is unlikely to reach the air flow-out opening 72o and therefore, the amount of the lubrication oil which can be used for lubricating the engine 10 is unlikely to decrease.

Second Embodiment

Next, a ventilation apparatus according to a second embodiment of the invention will be described. Hereinafter, the ventilation apparatus according to the second embodiment will be referred to as "the second embodiment apparatus". The second embodiment apparatus has the same configuration as the first embodiment apparatus except of the securing manner of the first introduction pipe 72 to the upper wall 51.

Figure 7:
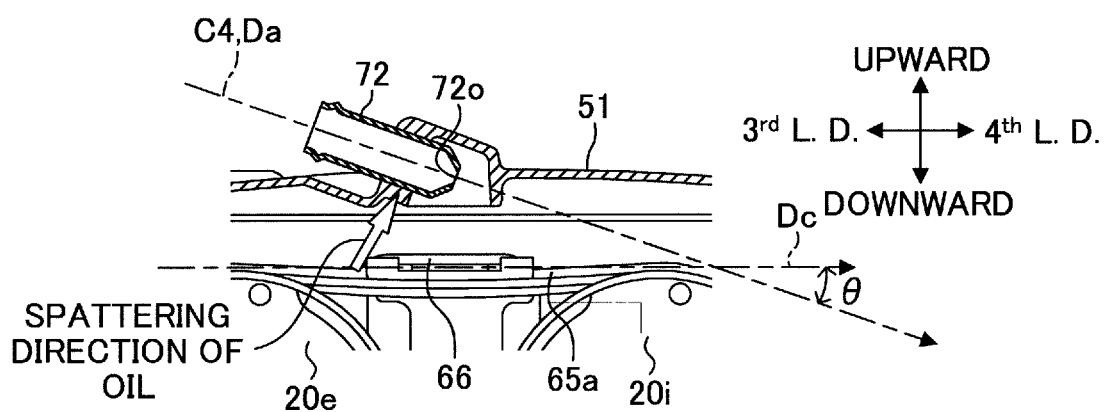
FIG. 7 is a view similar to FIG. 5 and which shows a part of an internal combustion engine, to which a ventilation apparatus according to a second embodiment of the invention is applied.

As shown in FIG. 7, when the air flow-out direction Da which the air flows out from the air flow-out opening 72o of the first introduction pipe 72 projected on the timing chain running plane Pc is referred to as "the projected flow-out direction Dap" and the direction Dc which the timing chain portion 65a runs projected on the timing chain running plane Pc is referred to as "the projected running direction Dcp", the first introduction pipe 72 of the second embodiment apparatus is secured to the upper wall 51 such that an angle θ between the projected flow-out direction Dap and the projected running direction Dcp is an acute angle.

The securing of the first introduction pipe 72 to the upper wall 51 at the acute angle reduces a possibility that the spattering-away lubrication oil enters into the air flow-out opening 72o. Therefore, the amount of the lubrication oil which can be used for lubricating the engine 10 can be surely prevented from decreasing.

It should be noted that the present invention is not limited to the aforementioned embodiment and various modifications can be employed within the scope of the present invention.

Figure 8:
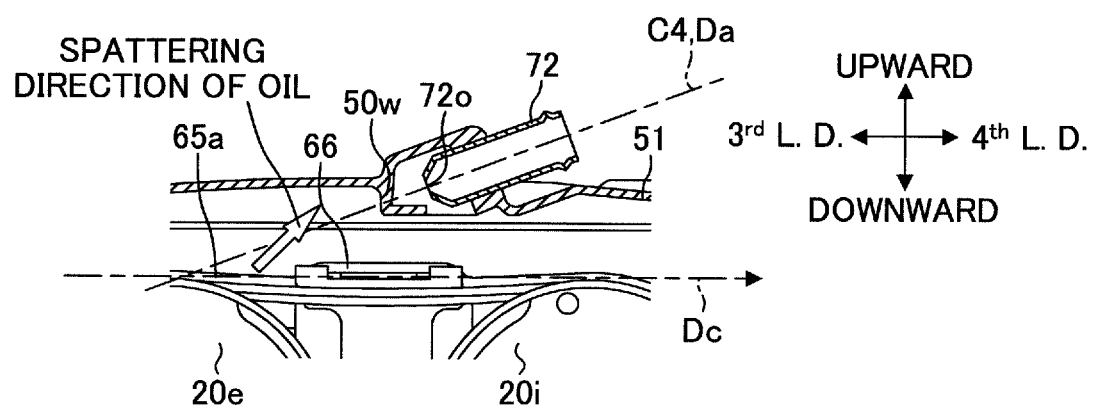
FIG. 8 is a view similar to FIG. 5 and which shows a part of an internal combustion engine, to which a ventilation apparatus according to a modified example of the first embodiment is applied.
Figure 9A:
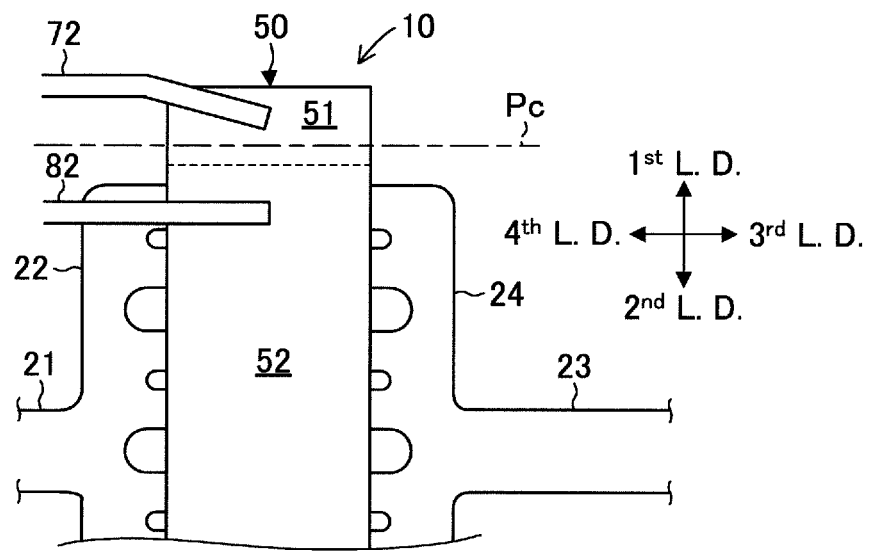
FIG. 9A is a view similar to FIG. 4 and which shows a ventilation apparatus according to one of modified examples of the first embodiment.
Figure 9B:
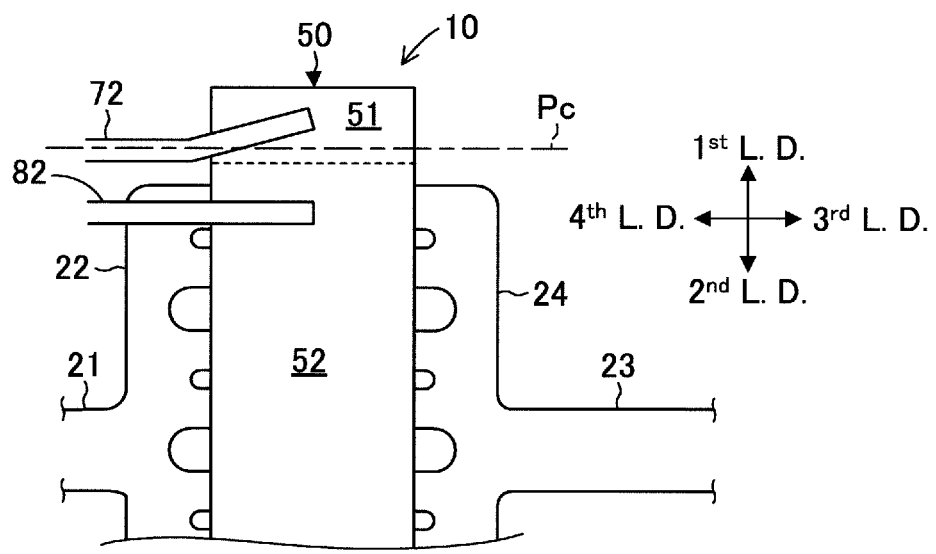
FIG. 9B is a view similar to FIG. 4 and which shows a ventilation apparatus according to another modified example of the first embodiment.
Figure 10A:
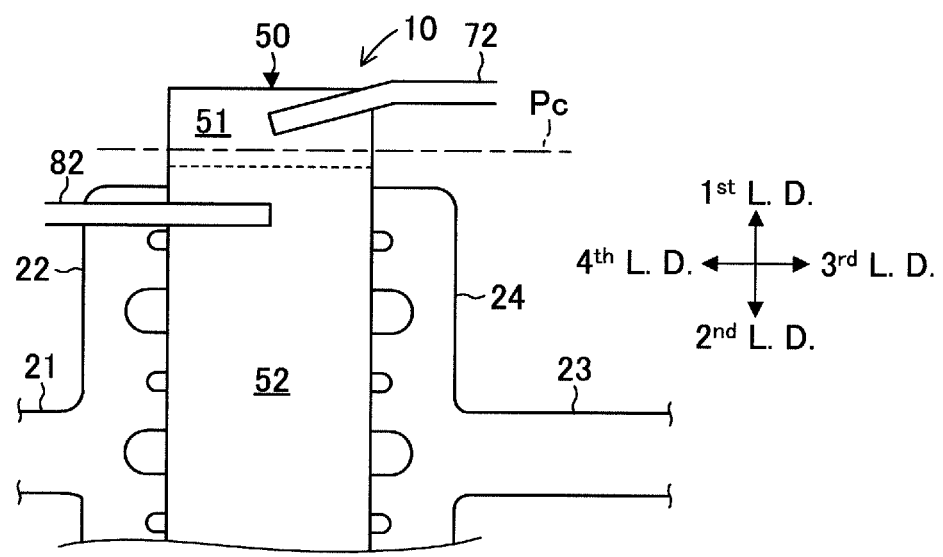
FIG. 10A is a view similar to FIG. 4 and which shows a ventilation apparatus according to one of modified examples of the second embodiment.
Figure 10B:
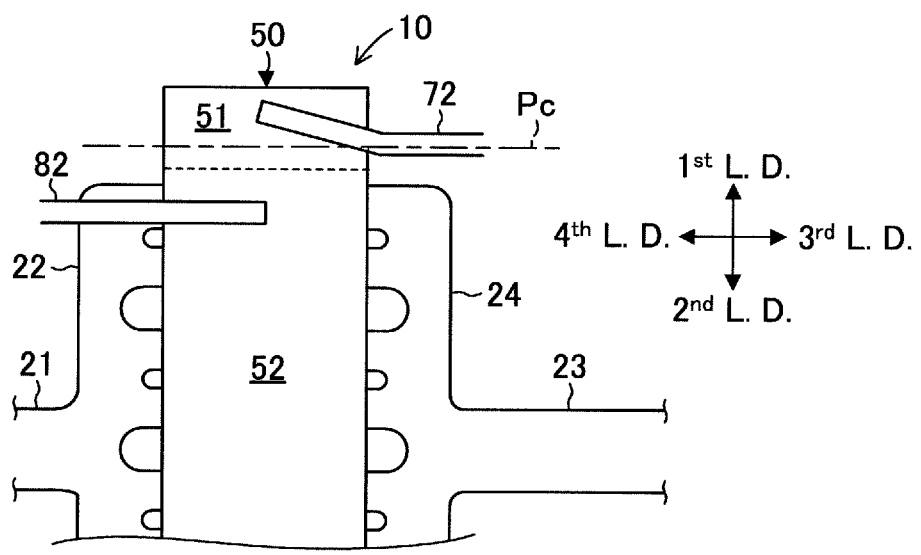
FIG. 10B is a view similar to FIG. 4 and which shows a ventilation apparatus according to another modified example of the first embodiment.

For example, as shown in FIG. 8, in the first embodiment apparatus, the barrier wall 50w may be provided such that the barrier wall 50w extends downwardly from the bottom wall surface of the upper wall 51 and then, bends to extend along the timing chain running direction Dc of the timing chain portion 65a Further, as shown in FIGS. 9A and 9B, in the first embodiment apparatus, the first introduction pipe 72 may be secured to the upper wall 51 such that the passage axis C4 of the first introduction pipe 72 crosses the timing chain running plane Pc. Similarly, as shown in FIGS. 10A and 10B, in the second embodiment apparatus, the first introduction pipe 72 may be secured to the upper wall 51 such that the passage axis C4 of the first introduction pipe 72 crosses the timing chain running plane Pc.

Furthermore, in the first and second embodiment apparatuses, the first introduction pipe 72 may be secured to the upper wall 51 such that the air flow-out opening 72o opens to the interior of the chain chamber 18 at a position remote from the timing chain running plane Pc in the second lateral direction.

What is claimed is:

1. A ventilation apparatus of an internal combustion engine, the engine comprising:
an intake passage;
a cylinder block in which at least one cylinder bore is formed;
a cylinder head mounted on the cylinder block at one side of the cylinder block in a bore axis extension direction which corresponds to a direction of an extension of a bore axis which corresponds to a center axis of the at least one cylinder bore;
a cylinder head cover mounted on the cylinder head at an opposite side of the cylinder head with respect to the cylinder block in the bore axis extension direction, the cylinder head cover including a first cylinder cover wall which extends crossing the bore axis at a first lateral area of the cylinder head cover, and a second cylinder cover wall which extends crossing the bore axis at a second lateral area of the cylinder head cover;
a crank shaft provided at an opposite side of the cylinder block with respect to the cylinder head in the bore axis extension direction;
intake and exhaust cam shafts provided between the cylinder head and the cylinder head cover;
a timing chain for transmitting rotation of the crank shaft to the intake and exhaust cam shafts, and
a chain cover mounted on the cylinder block at one side of the cylinder block in a cam shaft axis extension direction which corresponds to a direction of an extension of a cam shaft axis which corresponds to an axis of the intake cam shaft, the chain cover defining a chain chamber in cooperation with the cylinder block, the cylinder head and the first cylinder cover wall, the chain cover housing the timing chain,
the ventilation apparatus comprising:
a blow-by gas recirculation pipe which communicates an interior of the chain chamber with the intake passage; and
an air introduction pipe provided with an air flow-out opening which opens to the interior of the chain chamber,
the ventilation apparatus being configured to ventilate the chain chamber by recirculating blow-by gas in the chain chamber to the intake passage through the blow-by gas recirculation pipe and introducing air into the chain chamber through the air introduction pipe,
wherein the timing chain runs on a timing chain running plane which corresponds to a plane perpendicular to the cam shaft axis and runs straight at an area of the interior of the chain chamber around the air flow-out opening, and when projecting an air flow-out direction which corresponds to a direction of a flow-out of the air from the air flow-out opening and a timing chain running direction which corresponds to a direction of a running of the timing chain at the area of the interior of the chain chamber around the air flow-out opening to the timing chain running plane, the air introduction pipe is attached to the first cylinder cover wall such that an angle between the projected air flow-out direction and the projected timing chain running direction is an acute angle, and
the air introduction pipe is connected to a portion of the first cylinder cover wall directly above the timing chain, and both the air introduction pipe and the first cylinder cover wall are located above the timing chain.

2. The ventilation apparatus of the internal combustion engine according to claim 1, wherein a barrier wall is provided between the air flow-out opening and a crossing position at which a projected passage axis crosses a timing chain portion, the projected passage axis corresponding to an axis of a passage of the air introduction pipe projected to the timing chain running plane, the timing chain portion corresponding to a portion of the timing chain running at the area of the interior of the chain chamber around the air flow-out opening.

3. The ventilation apparatus of the internal combustion engine according to claim 2, wherein the engine comprises a top damper between the first cylinder cover wall and the timing chain portion, and the air introduction pipe is secured to the first cylinder cover wall such that the top damper exists between the air flow-out opening and the timing chain portion.

4. The ventilation apparatus of the internal combustion engine according to claim 1, wherein the engine comprises a top damper between the first cylinder cover wall and a timing chain portion which corresponds to a portion of the timing chain which runs at the area of the interior of the chain chamber around the air flow-out opening, and the air introduction pipe is secured to the first cylinder cover wall such that the top damper exists between the air flow-out opening and the timing chain portion.

5. The ventilation apparatus of the internal combustion engine according to claim 1, wherein the air introduction pipe is secured to the first cylinder cover wall such that the air flow-out opening opens to the interior of the chain chamber at a position remote from the timing chain running plane in a direction perpendicular to the timing chain running plane.

* * * * *